(12) United States Patent
Lessard (10) Patent No.: US 12,460,683 B2
(45) Date of Patent: Nov. 4, 2025

(54) TORQUE LIMITER, CORRESPONDING TRANSMISSION ASSEMBLY AND USE

(71) Applicant: COMPAGNIE ENGRENAGES ET REDUCTEURS—MESSIAN—DURAND, Cambrai (FR)

(72) Inventor: Fabrice Lessard, Cambrai (FR)

(73) Assignee: COMPAGNIE ENGRENAGES ET REDUCTEURS—MESSIAN—DURAND, Cambrai (FR)

( * ) Notice: Subject to any disclaimer, the term of this patent is extended or adjusted under 35 U.S.C. 154(b) by 0 days.

(21) Appl. No.: 18/777,576

(22) Filed: Jul. 19, 2024

(65) Prior Publication Data

US 2025/0035167 A1    Jan. 30, 2025

(30) Foreign Application Priority Data

Jul. 26, 2023  (FR) ...................................... 2308177

(51) Int. Cl.
  *F16D 7/04*    (2006.01)
  *F16D 7/02*    (2006.01)
  (Continued)

(52) U.S. Cl.
  CPC ............. *F16D 7/044* (2013.01); *F16D 7/024* (2013.01); *F16D 1/0882* (2013.01)

(58) Field of Classification Search
  CPC .. F16D 7/044; F16D 7/024; F16D 1/00–1/12; F16D 43/2024; F16D 43/213
  See application file for complete search history.

(56) References Cited

U.S. PATENT DOCUMENTS 1,126,219 A    1/1915  Hupp
2,723,014 A   11/1955  Locke
        (Continued)

FOREIGN PATENT DOCUMENTS

DE        4309521 A1 * 10/1993  ........... F16D 1/0882
DE   102006036961 B4     2/2008
        (Continued)

OTHER PUBLICATIONS

FR 2308177, INPI Rapport de Recherche Preliminaire, Feb. 2, 2024, 2 pages.

*Primary Examiner* — Tinh Dang
(74) *Attorney, Agent, or Firm* — Soquel Group LLC (57) ABSTRACT

A torque limiter including a first body and a second body extending about a central axis. The first body supports first limiter teeth and the second body supports second limiter teeth. The first and second limiter teeth define an engaged configuration and a release configuration. The torque limiter includes limited-retaining means retaining the first and second limiter teeth in the engaged configuration thereof when the torque is less than a transmission torque limit and yielding when the torque exceeds the transmission torque limit. The limited-retaining means include an inner limited-retaining element having an outer contact surface, and an outer limited-retaining element having an inner contact surface mating with the outer contact surface. The inner and outer limited-retaining elements having a retaining configuration wherein the inner limited-retaining element is clamped into the outer limited-retaining element, and a yielded configuration wherein the inner limited-retaining element is loosened from the outer limited-retaining element.

13 Claims, 10 Drawing Sheets

(51) Int. Cl.
*F16D 43/202* (2006.01)
*F16D 1/08* (2006.01)

(56) References Cited

U.S. PATENT DOCUMENTS

| | | | | |
|---|---|---|---|---|
| 2,741,352 | A * | 4/1956 | Stevens | F16D 43/206 |
| | | | | 192/114 R |
| 4,373,924 | A | 2/1983 | Schuhmacher | |
| 9,086,096 | B2 | 7/2015 | Long et al. | |
| 2010/0224713 | A1 | 9/2010 | Long | |
| 2011/0229259 | A1* | 9/2011 | Schussler | F16D 1/04 |
| | | | | 403/373 |
| 2015/0251856 | A1 | 9/2015 | Timtner | |

FOREIGN PATENT DOCUMENTS

| | | |
|---|---|---|
| DE | 102008050670 A1 | 5/2010 |
| DE | 102014008287 B3 | 10/2015 |
| DE | 102014008800 B3 | 10/2015 |
| DE | 202019003203 U1 | 10/2019 |
| EP | 0045027 B1 | 2/1982 |
| EP | 0349359 A1 | 1/1990 |
| EP | 2422114 B1 | 2/2012 |
| IT | 201900006296 A1 | 10/2020 |
| WO | 200075533 A1 | 12/2000 |
| WO | 2007104296 A1 | 9/2007 |
| WO | 2012023994 A1 | 2/2012 |
| WO | 2014027152 A1 | 2/2014 |
| WO | 2015073118 A1 | 5/2015 |
| WO | 2015193207 A1 | 12/2015 |
| WO | 2017116913 A1 | 7/2017 |

* cited by examiner

TORQUE LIMITER, CORRESPONDING TRANSMISSION ASSEMBLY AND USE

CROSS-REFERENCE TO RELATED APPLICATIONS

This application is a U.S. non-provisional application claiming the benefit of French Application No. 23 08177, filed on Jul. 26, 2023, which is incorporated herein by reference in its entirety.

TECHNICAL FIELD OF THE INVENTION

The present invention relates to a torque limiter, of the type including a first body, and a second body, the first body and the second body extending about a central axis, the first body supporting first limiter teeth, the second body supporting second limiter teeth, mating with the first limiter teeth, the first limiter teeth and the second limiter teeth defining an engaged configuration wherein the first limiter teeth and the second limiter teeth are suitable for transmitting a torque about the central axis of the first body to the second body and a release configuration, wherein the first limiter teeth and the second limiter teeth are inapt to transmit a torque between the first body and the second body, the torque limiter further comprising locking means suitable to oppose a transition of the first limiter teeth and the second limiter teeth from the release configuration thereof to the engaged configuration thereof, and limited-retaining means suitable for retaining the first limiter teeth and the second limiter teeth in the engaged configuration thereof when the torque is less than a transmission torque limit and suitable for yielding when the torque exceeds the torque transmission limit.

BACKGROUND OF THE INVENTION

Torque limiters adapted to limit the torque transmitted between a drive shaft and a driven shaft are known. A torque limiter is known, e.g., from U.S. Pat. No. 9,086,096B2. The torque limiter comprises pistons that are radially movable relative to the central axis of the driving and driven shafts. The pistons are spring-loaded radially inwards.

Another torque limiter is sold by the company Ringspann® under the name "SIKUMAT"® SU. Said torque limiter comprises balls arranged in axial housings and held in abutment by Belleville springs. When the torque limit is reached, the balls slide out of the housing thereof and roll to the next housing, repeating the process until the torque drops below the torque limit.

The torque limiters are relatively complex and hence expensive. In addition, such torque limiters have relatively low transmission limit forces for given dimensions.

SUMMARY OF THE INVENTION

The goal of the invention is to propose a torque limiter with a simple construction and which is used to transmit a high limit torque for given dimensions. Another goal of the invention is to propose a torque limiter serving to adjust the limit torque with inexpensive means and preferably with a small tolerance.

To this end, the subject matter of the invention is a torque limiter as indicated hereinabove, characterized in that the limited-retaining means comprise at least one inner limited-retaining element having an outer contact surface, and at least one outer limited-retaining element having an inner contact surface mating with the outer contact surface, the inner and outer limited-retaining elements having a retaining configuration, wherein the inner limited-retaining element is clamped in the outer limited-retaining element, and a yielded configuration wherein the inner limited-retaining element is loosened from the outer limited-retaining element.

According to particular embodiments of the torque limiter, the latter can have one or a plurality of the following features:
the outer contact surface has a frustoconical shape of revolution and wherein the inner contact surface has a frustoconical shape of revolution, in particular wherein the opening angle ($\alpha$) of the outer and inner contact surfaces is comprised between 1° and 20°;
the limited-retaining means comprise at least one cartridge, each cartridge comprising one of the at least one outer limited-retaining element and one of the at least one inner limited-retaining element,
the outer limited-retaining element is a sleeve, and
the inner limited-retaining element is a punch provided with a piston, more particularly the piston being suitable for extending through an opening of the cover with an opening of the cartridge;
when the inner limited-retaining element and the outer limited-retaining element are in the given configuration, the inner limited-retaining element is offset along the central axis relative to the outer limited-retaining element with respect to the retaining configuration thereof;
in the engaged configuration thereof, the first teeth and the second teeth fit over one another;
the torque limiter comprises
a first coupling flange fastened to the first body and provided with first coupling teeth, and
a second coupling flange fastened to the second body and equipped with second coupling teeth, and
the first coupling teeth are suitable for cooperating with mating coupling teeth, and
the second coupling teeth are suitable for cooperating with mating coupling teeth;
either the second limiter teeth are fixed relative to the second body, or the second limiter teeth comprise teeth inserts axially movable relative to the second body between the engaged configuration and the release configuration; and
the second body comprises two body parts axially movable relative to each other and fixed in rotation with respect to each other about the central axis.

A further subject matter of the invention is a transmission assembly, of the type comprising a drive shaft, a driven shaft, and a torque limiter, characterized in that the torque limiter is a torque limiter as defined hereinabove, in that the first body is fastened in rotation to the drive shaft, and the second body is fastened in rotation to the driven shaft.

According to particular embodiments of the transmission assembly, same can include one or a plurality of the following features:
the drive shaft comprises mating coupling teeth and the driven shaft comprises mating coupling teeth and the torque limiter is a torque limiter as defined hereinabove.

A further subject matter of the invention is the use of a transmission assembly as defined hereinabove, comprising the following successive steps:
supply of the transmission assembly, with the inner and outer limited-retaining elements being in the yielded configuration thereof; and setting the inner and outer limited-retaining elements into the retaining configuration thereof by applying the outer contact surface to the inner contact surface, clamping the inner limited-retaining element into the outer limited-retaining element.

According to particular embodiments of the transmission assembly, same can have one or a plurality of the following features:

the use further comprises the following successive steps, implemented after the step of putting the inner and outer limited-retaining elements into the retaining configuration thereof:

exceeding the transmission torque limit, thereby leading to setting the first limiter teeth and the second limiter teeth in the release configuration, meshing of the torque limiter by placing the inner and outer limited-retaining elements in the retaining configuration thereof by applying the outer contact surface to the inner contact surface, thereby clamping the inner limited-retaining element into the outer limited-retaining element.

BRIEF DESCRIPTION OF THE DRAWINGS

The invention will be better understood upon reading the following description, given only as an example and making reference to the enclosed drawings, wherein.

DETAILED DESCRIPTION

Hereinafter, the term "fastened" or "fixed" without further specification is used to refer to a connection without any degree of freedom. The term "fastened" or "fixed" with the indication of the degree of freedom concerned is used to generally refer to a fixed connection with regard to the indicated degree of freedom and free or not free with regard to the other degrees of freedom. A person skilled in the art knows how to remove the degrees of freedom in order to arrive at a device having the needed degrees of freedom.

Figure 1:
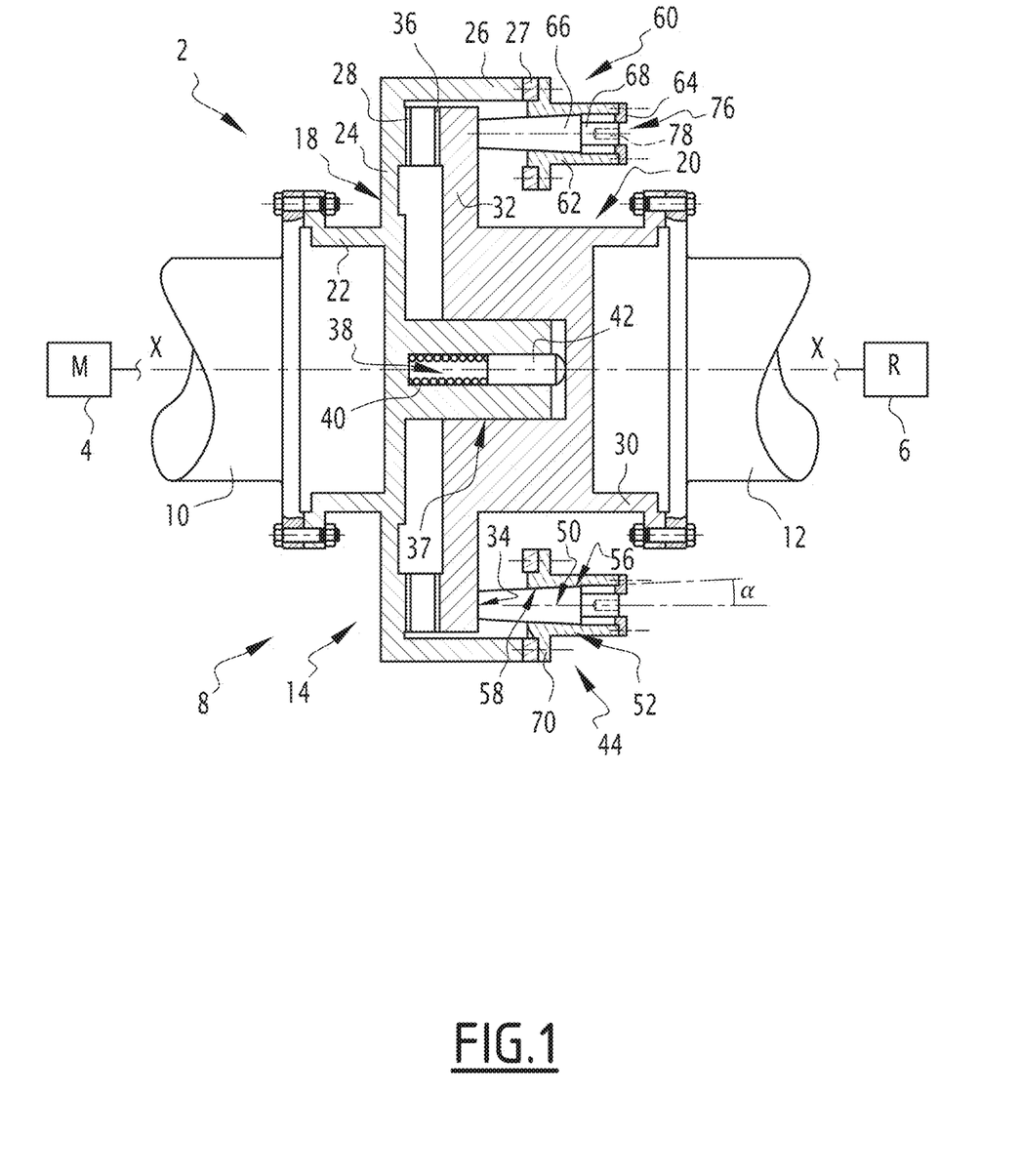
FIG. 1 shows a schematic view of an installation comprising a transmission assembly according to a first embodiment of the invention equipped with a torque limiter, the torque limiter being in an engaged configuration.

FIG. 1 shows a schematic view of an installation according to the invention, indicated by the general reference 2. The installation 2 comprises a driving device 4, such as a motor M, and a driven device 6, such as a reducer R or a grinder. The installation 2 comprises a transmission assembly 8 according to the invention connecting the driving device 4 to the driven device 6 in preparation for the driving thereof.

The transmission assembly 8 comprises a drive shaft 10, a driven shaft 12, and a torque limiter 14 connecting the drive shaft 10 to the driven shaft 12. The drive shaft 10 is, e.g., the output shaft of the driving device 4 and the driven shaft 12 is, e.g., the input shaft of the driven device 6. The drive shaft 10 is in the present case an axially fixed shaft, while the driven shaft 12 is an axially movable shaft.

The torque limiter 14 is suitable for transmitting a torque from the drive shaft 10 to the driven shaft 12 when the torque is less than a transmission torque limit. The torque limiter 14 is suitable for yielding when the torque reaches or exceeds the transmission torque limit and thereby to allow free rotation of the drive shaft 10 with respect to the driven shaft 12 when the torque reaches or exceeds the transmission torque limit.

The torque limiter 14 defines a central axis X-X, which is in the present case coaxial with the drive shaft 10 and with the driven shaft 12. Unless otherwise stated, the expressions "axial", "radial" and "circumferential" are used with respect to the central axis X-X.

The torque limiter 14 is provided with a first body 18 and a second body 20, the first body and the second body extending around the central axis X-X and being centered on the central axis X-X.

The first body 18 is, in the present case, an axially fixed body. The first body 18 is fixed axially, radially and circumferentially to the drive shaft 10.

The second body 20 is, in the present case, an axially movable body. The second body 20 is fixed axially, radially and circumferentially to the driven shaft 12. The driven shaft 12, and thus the second body 20, is axially movable with respect to the drive shaft 10 and with respect to the first body 18.

In general, the terms "axially fixed body" and "axially movable body" mean, in the context of the present invention, that the axial mobility of the axially movable body is greater than the axial mobility of the axially fixed body in order to enable the release configuration to be adopted (see hereinafter). The axial mobility can be obtained by different technical means.

The first body 18 comprises, in the present case, a first flange 22 for fastening to the drive shaft 10, a first connection flange 24, an outer skirt 26, and a support ring 27. The first connection flange 24 is arranged axially between the first connection flange 22 and the outer skirt 26. The support ring 27 is fastened to the outer skirt 26. The shape of the first body 18 may vary from the shape of the first embodiment.

The first body 18 supports a first limiter set of teeth or first limiter teeth 28, in the present case axial teeth, and in the present case fastened to the first connection flange 24.

The second body 20 comprises, in the present case, a second flange 30 for fastening to the driven shaft 12, a second connection flange 32 and a thrust surface 34.

The second body 20 supports a second limiter set of teeth or second limiter teeth 36, in the present case axial teeth, and in the present case fastened to the second connection flange 32. In the present case, the first and second limiter teeth 28, 36 each form a ring gear the teeth of which protrude axially. The first limiter set of teeth 28 and the second limiter set of teeth 36 may be integral with the first body 18 and the second body 20, respectively, or may be one or a plurality of distinct parts.

Figure 3:
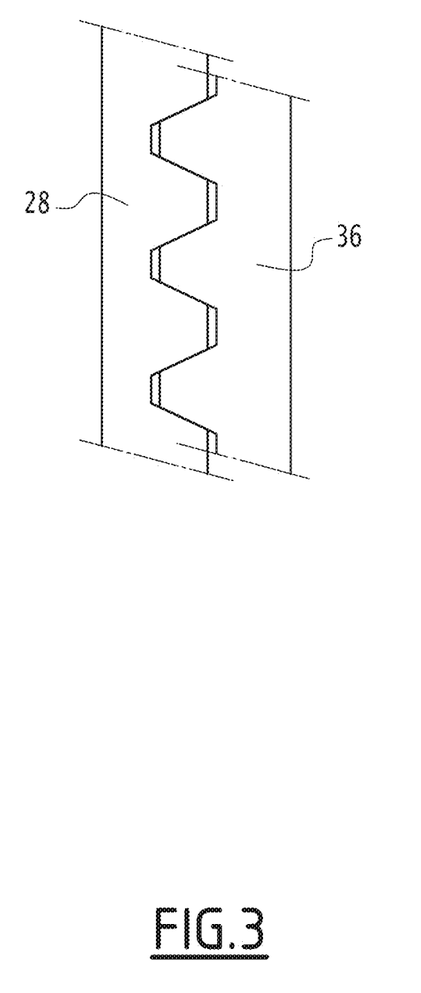
FIG. 3 is a radial view of a part of the torque limiter shown in FIG. 1.

The second limiter teeth 36 match or are complementary to the first limiter teeth 28. The first limiter set of teeth 28 and the second limiter set of teeth 36 define an engaged configuration (FIG. 1) wherein the first limiter teeth 28 and the second limiter teeth 36 are suitable for transmitting a torque about the central axis X-X from the first body 18 to the second body 20. In the engaged configuration, during a rotation of the first body 18 about the central axis X-X, the first limiter set of teeth 28 and the second limiter set of teeth 36 transmit the torque of rotation about the central axis X-X from the first body 18 to the second body 20. Such configuration is shown in FIGS. 1 and 3.

In the engaged configuration, the first limiter teeth 28 and the second limiter teeth 36 are applied to each other, i.e., without the interposition of a limitation body. In the engaged configuration, the surface of the first limiter teeth 28 is thus in contact with the surface of the second limiter teeth 36.

Figure 2:
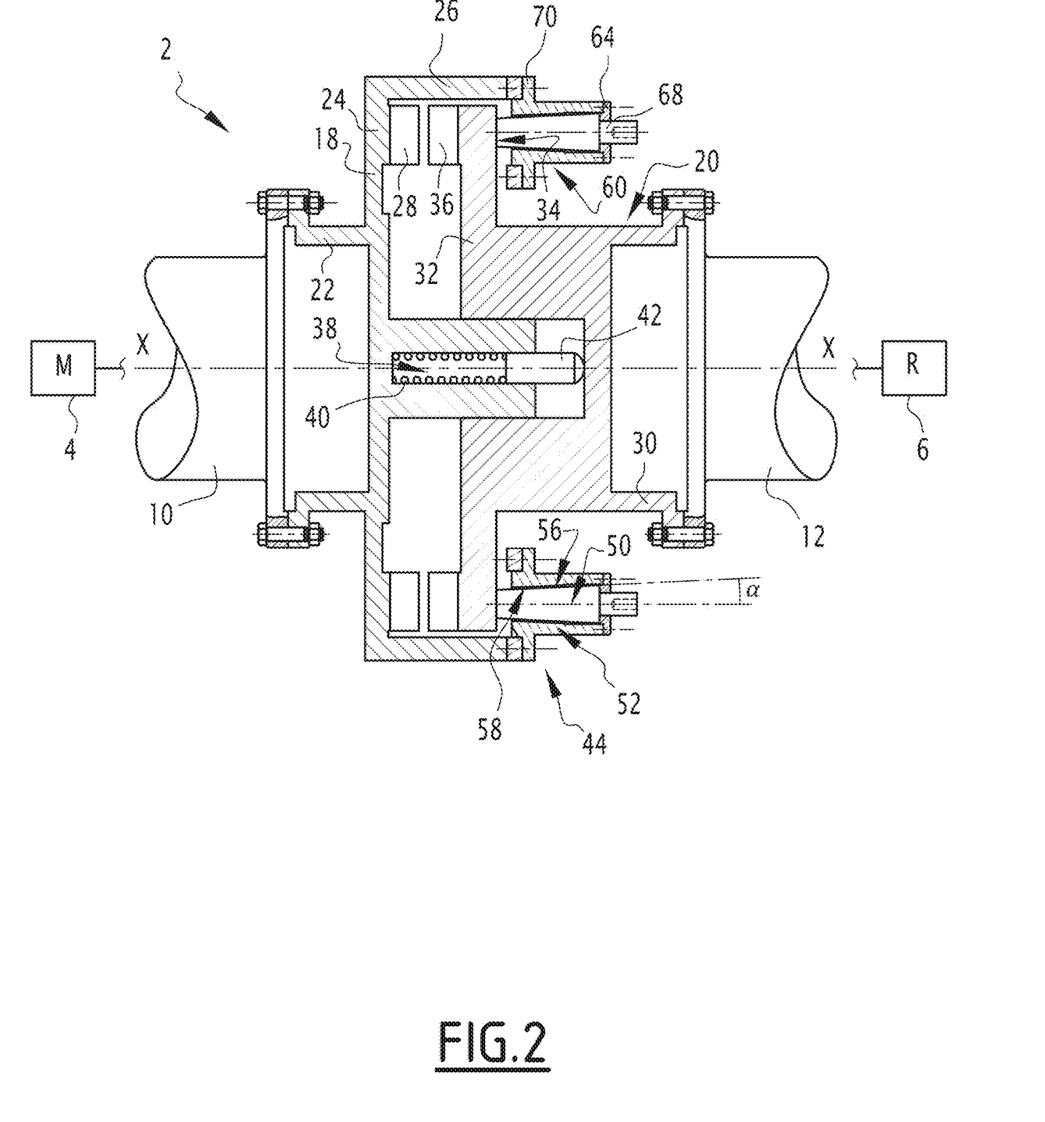
FIG. 2 shows the installation of FIG. 1 with the torque limiter in a release configuration.
Figure 4:
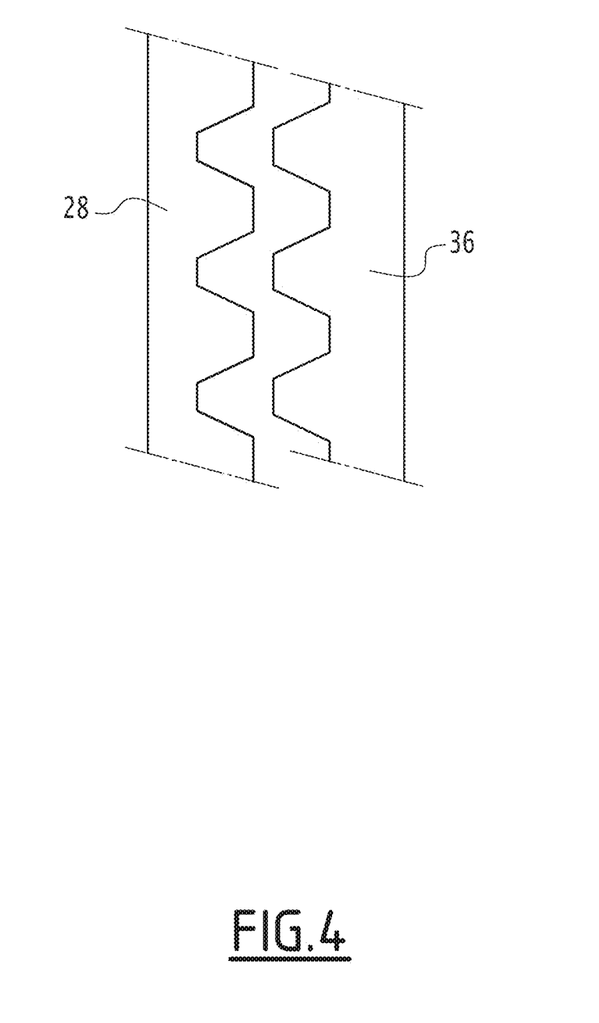
FIG. 4 shows the radial view of a part of the torque limiter shown in FIG. 2, the view corresponding to the view of FIG. 3.

The first limiter teeth 28 and the second limiter teeth 36 define a release configuration, wherein the first limiter set of teeth 28 and the second limiter set of teeth 36 are inapt of transmitting a torque between the first body and the second body and thus make the first body 18 and the second body 20 free to rotate with respect to each other. In the release configuration, the first and second limiter teeth 28, 36 are axially spaced apart and spaced apart from each other. Such release configuration is shown in FIGS. 2 and 4.

The first and second limiter teeth 28, 36 are suitable for generating an axial force transitioning the first body 18 and the second body 20 from the engaged configuration thereof to the release configuration thereof, under the effect of the transmitted torque. To this end, the flanks of the teeth of the first and second limiter teeth 28, 36 are, e.g., oblique with respect to all the planes comprising the central axis X-X. In the present case, when a torque is transmitted, the second limiter teeth 36 is stressed to the right in FIG. 1.

The first body 18 and the second body 20 define, in the present embodiment, an engaged configuration and a release configuration respectively which correspond to the engaged configuration and to the release configuration respectively of the first and second teeth 28, 36.

The torque limiter 14 further comprises guiding means 37 suitable for guiding, and in particular guiding, the first body 18 with respect to the second body 20 in rotation about the central axis X-X when the first limiter teeth 28 and the second limiter teeth 36 are in the release configuration.

In the present case, the guiding means 37 are also suitable for guiding the first body 18 relative to the second body 20 axially along the central axis X-X and in rotation about the central axis X-X when the first body 18 and the second body 20 are in the release configuration thereof. In the present case, the guiding means 37 are schematically represented as mating cylindrical bearing surfaces of circular cross-section. The guiding means 37 in the present case have axial freedom and permit an offset of the first body 18 with respect to the second body 20 between the release configuration thereof and the engaged configuration thereof.

The torque limiter 14 further comprises locking means 38 suitable for opposing a transition of the first limiter teeth 28 and of the second limiter teeth 36 from the release configuration thereof to the engaged configuration thereof. The locking means 38 can be released.

In the present case, the locking means 38 are suitable for going against the transition of the first body 18 and of the second body 20 from the release configuration to the engaged configuration thereof.

The locking means 38 oppose an untimely engagement of the engaged configuration of the first limiter set of teeth 28 and of the second limiter set of teeth 36, and thus, in the present case, of the first body 18 and of the second body 20.

In the present case, the locking means 38 comprise means of transitioning the first body 18 and the second body 20 from the engaged configuration thereof into the release configuration thereof. Such means of transitioning comprise, e.g., a spring 40, in particular arranged in a bore of the first body 18, pushing the first body and the second body 20 axially away from each other, in the present case via a thrust cylinder 42.

In a variant (not shown), the locking means 38 may comprise other locking elements, such as locking balls subject to thrust springs, engaging in recesses, or magnets cooperating with ferromagnetic parts.

The torque limiter 14 further comprises limited-retaining means 44 for retaining the first limiter set of teeth 28 and the second limiter set of teeth 36 in the engaged configuration thereof when the torque is less than a transmission torque limit and suitable for yielding when the torque exceeds the transmission torque limit. In the present case, the limited-retaining means 44 are suitable for retaining the first body 18 and the second body 20 in the engaged configuration thereof when the torque is less than the transmission torque limit, against the axial force generated by the first limiter teeth 28 and the second limiter teeth 36. If appropriate, the limited-retaining means 44 are further suitable for retaining the first body 18 and the second body 20 in the engaged configuration thereof against the force of the locking means 38, although said force is generally negligible. The limited-retaining means 44 are suitable for yielding, and yield, when the torque reaches or exceeds the transmission torque limit. The limited-retaining means 44 thus define a yield force which corresponds to the axial force generated by the first limiter set of teeth 28 and the second limiter set of teeth 36 when the transmission torque limit is reached or exceeded. Where appropriate, the yield force corresponds in addition to the axial force of the locking means 38.

The limited-retaining means 44 comprise at least one inner limited-retaining element 50 and at least one outer limited-retaining element 52 mating with the inner limited-retaining element 50.

Hereinafter, a set of retaining elements consisting of only one inner limited-retaining element 50 and only one outer limited-retaining element 52 will be described.

The inner limited-retaining element 50 has an outer contact surface 56 and the outer limited-retaining element 52 has an inner contact surface 58 mating with the outer contact surface 56.

The inner limited-retaining element 50 is thus a male element and the outer limited-retaining element 52 is a female element.

The inner 50 and outer 52 limited-retaining elements have a retaining configuration, wherein the inner limited-retaining element 50 is clamped, in particular by friction, into the outer limited-retaining element 52 (FIG. 1) and a yielded configuration wherein the inner limited retainer 50 is loosened from the outer limited retainer (FIG. 2).

All the inner limited-retaining elements 50 and outer limited-retaining elements 52 define, by the retaining configuration thereof, the yield force.

In the retaining configuration, the outer limited-retaining element 52 is only elastically deformed with respect to the yielded configuration.

The inner 50 and outer 52 limited-retaining elements are suitable for adopting the retaining configuration and the yielded configuration, in a reversible way.

The inner limited-retaining element 50 is preferably made of steel, in particular of high-alloy steel. The outer limited-retaining element 52 is preferably made of steel, in particular of high-alloy steel. The inner limited-retaining means 50 and the outer limited-retaining means 52 may have undergone surface treatment, such as nitriding or carburizing.

In FIGS. 1 and 2, two sets of retaining elements and thus two inner limited-retaining elements 50 and two outer limited-retaining elements 52 are shown. The number of inner limited-retaining elements 50 and of outer limited-retaining elements 52 depends on the required transmission torque limit and on the maximum transmission force capacity of each set of retaining elements.

Generally, the number of sets of retaining elements may be comprised between 6 and 36, more particularly between 8 and 24.

In the present case and preferably, the outer contact surface 56 has a frustoconical shape of revolution. Similarly, the inner contact surface 58 has a frustoconical shape of revolution. The truncated cones extend along a cone axis A-A which extends parallel to the central axis X-X.

The opening angle α of the outer 56 and inner 58 contact surfaces is comprised between 1° and 20°, and preferably between 2° and 10°. The opening angle α is measured with respect to the cone axis A-A. The opening angles α of the outer and inner contact surfaces are preferably identical. The outer 56 and inner 58 contact surfaces flare along the direction going from the engaged configuration to the release configuration (to the right in FIG. 1).

In the retaining configuration, the inner limited-retaining element 50 is held in the outer limited-retaining element 52 by static friction. In other words, in the retaining configuration, the static friction opposes adopting the yielded configuration.

When the outer limited-retaining element 52 begins to yield, the contact with the inner limited-retaining element 50 becomes a sliding friction contact, and thus having a coefficient of friction lower than the coefficient of static friction, combined with a decrease in the pressure exerted on the inner limited-retaining element 50. As a result, once the outer limited-retaining element 52 begins to yield, the yielding process is self-sustaining.

The inner limited-retaining element 50 and the outer limited-retaining element 52 are suitable for adopting the retaining configuration and the yielded configuration, in a reversible way.

Thereby, the torque limiter 14 can be re-meshed, re-armed or re-engaged.

Advantageously, the limited-retaining means 44 comprise at least one cartridge 60. Each cartridge 60 comprises one of the inner limited-retaining elements 50 and one of the outer limited-retaining elements 52. In the present case, the cartridge 60 is provided with only one inner limited-retaining element 50 and only one outer limited-retaining element 52. The outer limited-retaining element 52 is a sleeve 62. The cartridge 60 is provided with a cover with an opening 64. The inner limited-retaining element 50 is a punch or driver 66 provided with a piston 68 which is advantageously suitable for extending, and in particular which extends at least in the yielded configuration, through the opening of the cover with an opening 64.

The cartridge 60 is, moreover, advantageously provided with a flange 70 for fastening the cartridge 60 to the first body 18, and more precisely to the support ring 27.

When the inner limited-retaining element 50 and the outer limited-retaining element 52 are in the released configuration (FIG. 2), the inner limited-retaining element 50 is offset along the central axis X-X relative to the outer limited-retaining element 52 with respect to the retaining configuration thereof (FIG. 1). The inner limited-retaining element 50 and the outer limited-retaining element 52 together define a transfer direction, which is parallel to the central axis X-X.

Advantageously, when the inner limited-retaining element 50 and the outer limited-retaining element 52 are in the yielded configuration (FIG. 2), the piston 68 protrudes out from the cover with an opening 64. Advantageously, when the inner limited-retaining element 50 and the outer limited-retaining element 52 are in the retaining configuration (FIG. 1), the piston 62 is retracted into the cover with an opening 64.

Advantageously, when the inner limited-retaining element 50 and the outer limited-retaining element 52 are in the yielded configuration (FIG. 2), the outer contact surface 56 and the inner contact surface 58 are spaced apart from each other.

In the unmounted state of the cartridge 60, i.e., in the absence of the first body 18, the cartridge 60 can be handled as a single unit, without the inner limited-retaining element 50 and the outer limited-retaining element 52 becoming completely detached. Thereby, the cartridge 60 is a module which can be delivered preassembled.

The torque limiter 14 may also be provided with disengagement means 76 suitable for bringing the inner limited-retaining elements 50 and the outer limited-retaining elements 52 from the retaining configuration thereof into the yielded configuration thereof, when the torque limiter 14 is stopped. The disengagement means 76 are suitable for making possible a movement, in the present case by traction, of the inner limited-retaining element 50 toward the yielded configuration. The disengagement means 76 comprise, e.g., a tapping 78 provided in the inner limited-retaining element 50 wherein a traction element can engage. Thereby, the torque limiter 14 is easy to maintain.

The torque limiter 14 according to the invention operates as follows.

One starts from the situation shown in FIG. 2, i.e., the first and second limiter teeth 28, 36 are in the release configuration thereof. All the inner 50 and outer 52 limited-retaining elements are thus in the yielded configuration thereof.

The inner and outer limited-retaining elements are moved to the retaining configuration thereof. Thereby, each inner limited-retaining element 50 is pushed so that the inner limited-retaining element 50 is clamped in the associated outer limited-retaining element 52. On such occasion, the outer contact surface comes into contact with the inner contact surface and presses against same.

On such occasion, the first limiter teeth 28 and the second limiter teeth 36 are moved axially toward each other until the first limiter teeth 28 and the second limiter teeth 36 are in the engaged configuration thereof. In the present case, the first body 18 and the second body 20 are axially brought closer to one another until same are in the engaged configuration.

The approach of the first limiter teeth 28 to the second limiter teeth 36 takes place by overcoming the locking means 38, and in the present case against the force exerted by the transitioning means.

In the present case, a defined axial force is applied to the piston 68 toward the first limiter teeth 28. The defined axial force is such that the axial retaining force of all the combined inner 50 and outer 52 limited-retaining elements corresponds to the axial force generated by the first and second limiter teeth 28, 36 when the limit of the transmission of the transmission torque limit is reached, including, where appropriate, the force of the transitioning means. The axial retaining force of all the combined inner 50 and outer 52 limited-retaining elements is thus identical to the yield force.

The torque limiter 14 then adopts the engaged configuration shown in FIG. 1.

The drive shaft 10 is then driven into rotation about the central axis X-X and via the torque limiter 14, drives the driven shaft 12 into rotation.

When the transmission torque limit is reached or exceeded, the axial reaction force of the first limiter teeth 28 and of the second limiter teeth 36 makes yield all the outer retaining elements 52 which axially release the inner retaining elements 50. The axial release takes place by overcoming the static friction force between the inner retaining elements 50 and the outer retaining elements 52.

The second limiter teeth 36 move axially away from the first limiter teeth 28. The inner retaining elements 50 also move axially away from the first body 18. In the present case, the second body 20 moves axially away from the first body 18, under the effect of the axial reaction force of the first and second limiter teeth 28, 36. In the present case, the movement is favored by the force of the transitioning means (spring 40).

The second body 20 and the inner 50 and outer 52 retaining elements adopt the configuration shown in FIG. 2. In said configuration, the locking means 38 goes against a movement of the second limiter teeth 36 toward the first limiter teeth 28 and the adopting thereof of the engaged configuration.

The drive shaft 10 can thereby rotate freely about the driven shaft 12 and damage to the driven device 6 located downstream of the torque limiter 14 is prevented.

The torque limiter 14 again adopts the configuration shown in FIG. 2. Once the torque limiter 14 is in the release configuration thereof, the locking means 38 oppose a movement of the second limiter teeth 36 toward the first limiter teeth 28 and the adopting of the engaged configuration thereof.

In order to re-mesh, re-engage or re-arm the torque limiter 14, the operations described hereinabove are repeated until torque limiter 14 returns to the engaged configuration shown in FIG. 1.

Figure 5:
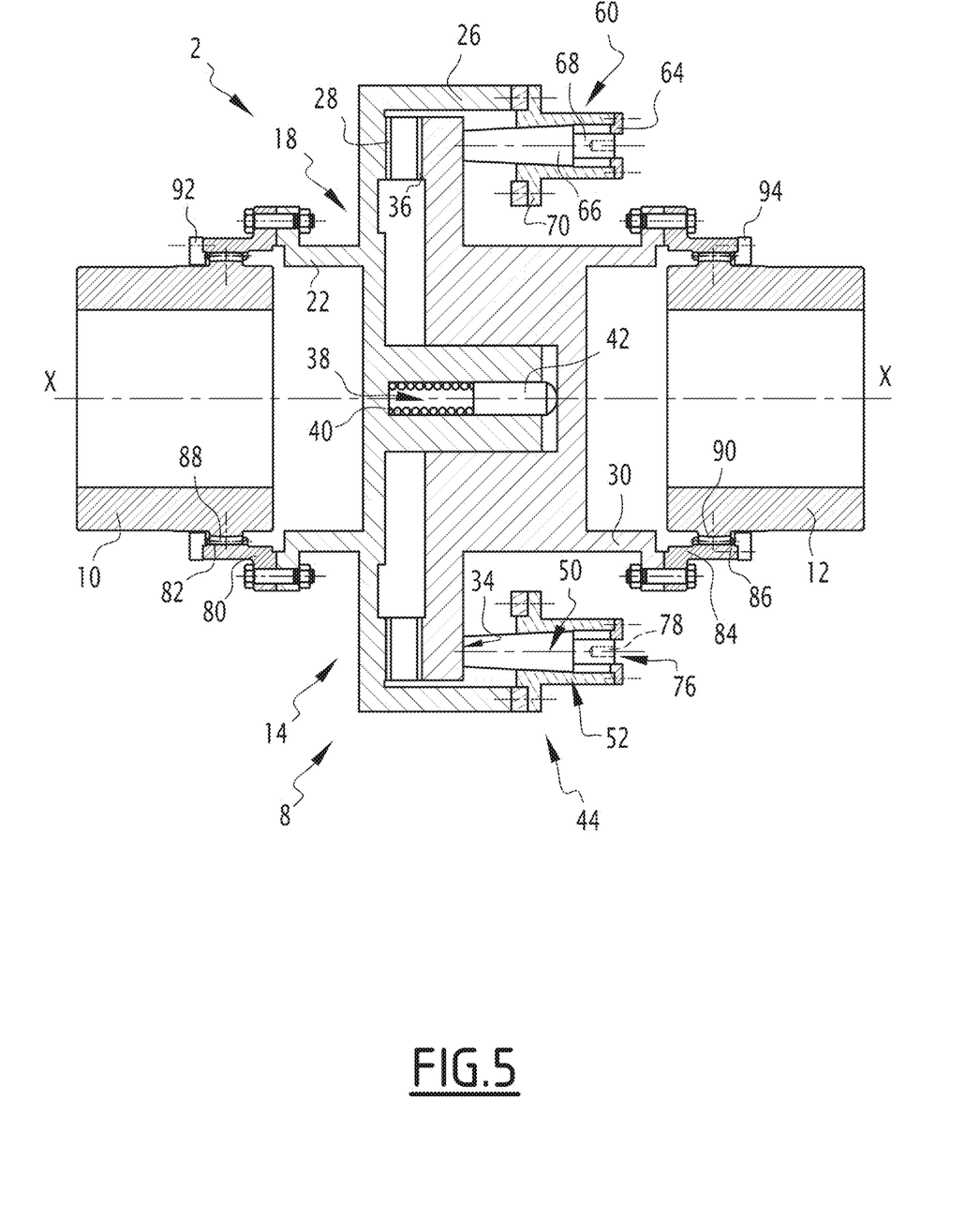
FIG. 5 schematically shows a transmission assembly according to a second embodiment of the invention with the torque limiter in the engaged configuration.

FIG. 5 schematically shows a transmission assembly 8 according to a second embodiment of the invention, the torque limiter 14 being in its engaged configuration, in a manner similar to the configuration shown in FIG. 1. Hereinafter, only the differences with respect to the first embodiment are described. Similar elements have the same references.

The driven shaft 12 is a shaft which is axially fixed with respect to the drive shaft 10.

The torque limiter 14 comprises, on the one hand, a first coupling flange 80 provided with first coupling teeth 82 and fastened to the first body 18 and, on the other hand, a second coupling flange 84 provided with second coupling teeth 86 and fastened to the second body 20.

The drive shaft 10 is provided with mating coupling teeth 88 which cooperate with the first coupling teeth 82. The first coupling teeth 82 and the mating coupling teeth 88 connect the drive shaft 10 to the first body 18 securely in rotation about the central axis X-X, but free in axial translation and free in rotation about the breaking axes extending perpendicularly to the central axis X-X.

Similarly, the driven shaft 12 is provided with mating coupling teeth 90 which cooperate with the second coupling teeth 86. The second coupling teeth 86 and the mating coupling teeth 90 connect the driven shaft 12 to the second body 20 securely in rotation about the central axis, but free in axial translation and free in rotation about the breaking axes extending perpendicularly to the central axis X-X.

The torque limiter 14 comprises an axial stop 92 limiting the axial movement of the first body 18 unilaterally with respect to the drive shaft 10 toward the second body 20. The torque limiter 14 comprises an axial stop 94 limiting the axial movement of the second body 20 unilaterally with respect to the driven shaft 12 toward the first body 18.

Such embodiment permits a radial offset of the drive shaft 10 and of the driven shaft 12.

The device shown in FIG. 5 operates as follows.

When the transmission torque limit is reached or exceeded, the second body 20 moves axially away from the first body 18 under the effect of the axial reaction force of the first and second limiter teeth 28, 36 as in the first embodiment, however, with the difference that the first and second coupling teeth 82, 86 and the mating coupling teeth 88, 90 permit an axial movement of the first body 18 and of the second body 20 with respect to the drive shaft 10 and with respect to the driven shaft 12.

The axial position of the driven shaft 12 relative to the drive shaft 10 remains unchanged when the release configuration is adopted from the engaged configuration.

Figure 6:
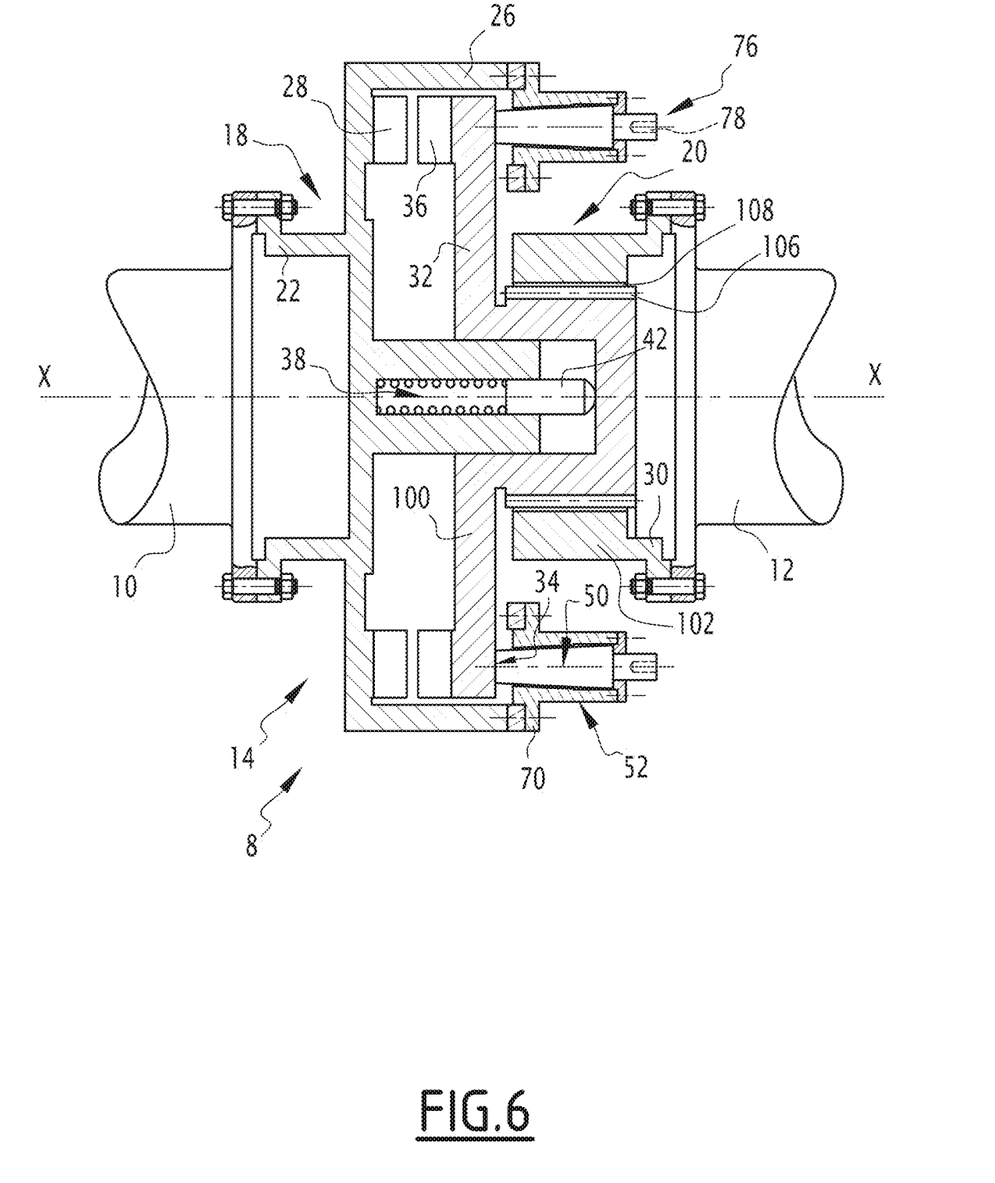
FIG. 6 schematically shows a transmission assembly according to a third embodiment of the invention, the torque limiter being in the release configuration.

FIG. 6 schematically shows a transmission assembly according to a third embodiment of the invention, the torque limiter 14 being in the release configuration, in a manner similar to the configuration shown in FIG. 2. Hereinafter, only the differences with respect to the first embodiment are described. Similar elements have the same references.

The driven shaft 12 is a shaft which is axially fixed with respect to the drive shaft 10, in a similar manner to the second embodiment.

The second body 20 comprises two body parts 100, 102 which are axially movable relative to each other and fixed in rotation relative to each other about the central axis X-X, in the present case by external grooves 106 which cooperate with internal grooves 108.

The body part 100 comprises the connection flange 32, the thrust surface 34 and supports the second teeth 36. The body part 100 comprises the external grooves 106. The body part 100 is also in contact with the thrust cylinder 42.

The body part 102 forms the fastening flange 30 and comprises the internal grooves 108.

During the transition between the release configuration and the engaged configuration, the body part 100 moves axially with respect to the body part 102, whereas the body part 102 remains axially immobile.

FIGS. 7 to 10 show a transmission assembly 8 according to a fourth embodiment. Hereinafter, only the differences or particularities with respect to the second embodiment (FIG. 5) are described. Similar elements have the same references.

Figure 7:
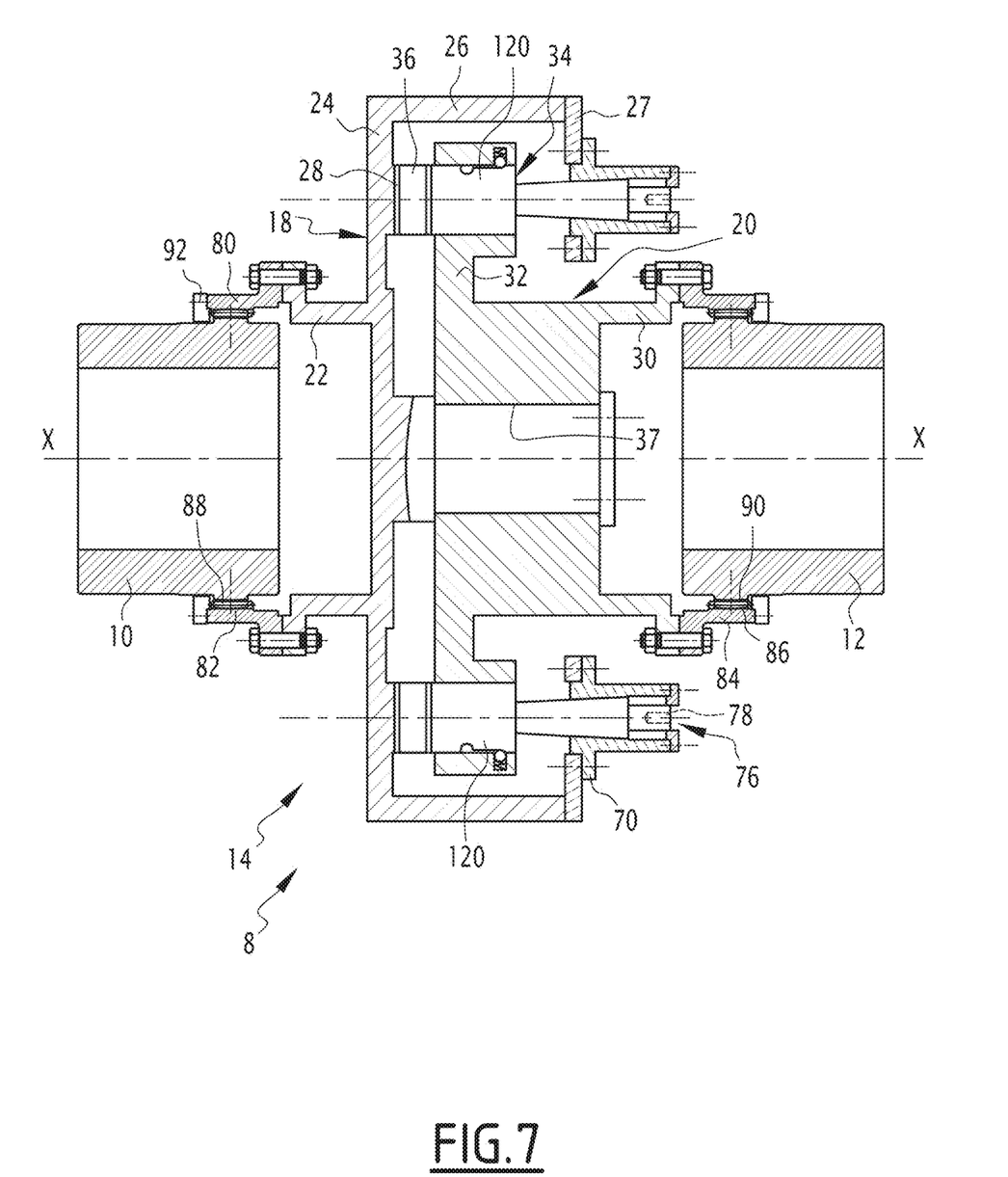
FIG. 7 schematically shows a transmission assembly according to a fourth embodiment of the invention, the torque limiter being in the engaged configuration.

FIG. 7 schematically shows the transmission assembly 8 with the torque limiter 14 in the engaged configuration thereof.

The guiding means 37 have no axial degree of freedom along the central axis X-X and thus prevent an axial offset of the first body 18 with respect to the second body 20 between the release configuration and the engaged configuration. The axial position of the first body 18 with respect to the second body 20 in the release configuration and in the engaged configuration is thus identical.

The second limiter teeth 36 is supported by the second body 20 and is axially movable relative to the second body 20. The second limiter teeth 36 comprise teeth inserts 120 arranged on the second body 20. The teeth inserts 120 are axially movable relative to the second body 20 between the engaged configuration and the release configuration.

To this end, in the present case, each teeth insert 120 comprises a cylindrical guide surface and the second body 20 comprises a mating cylindrical guide surface.

In the present case, each teeth insert 120 comprises a single tooth 124. Each teeth insert 120 may comprise between one and three teeth 124 included so that the number of teeth 124 of each teeth insert 120 is less than four.

Each teeth insert 120 comprises a thrust surface 34 on which one of the inner limited-retaining elements 50 bears.

Thereby, each teeth insert 120 can be made of a material with high mechanical strength and with small tolerances, while keeping the overall cost of the torque limiter acceptable. The maximum torque that can be transmitted by the torque limiter can thereby also be easily adapted. Each teeth insert 120 is, e.g., made of high-alloy steel, preferably having undergone a surface treatment such as nitriding, carburizing or quenching.

Advantageously, the number of teeth inserts 120 and the number of internal limited-retaining elements 50 of the torque limiter 14 are identical.

Figure 10:
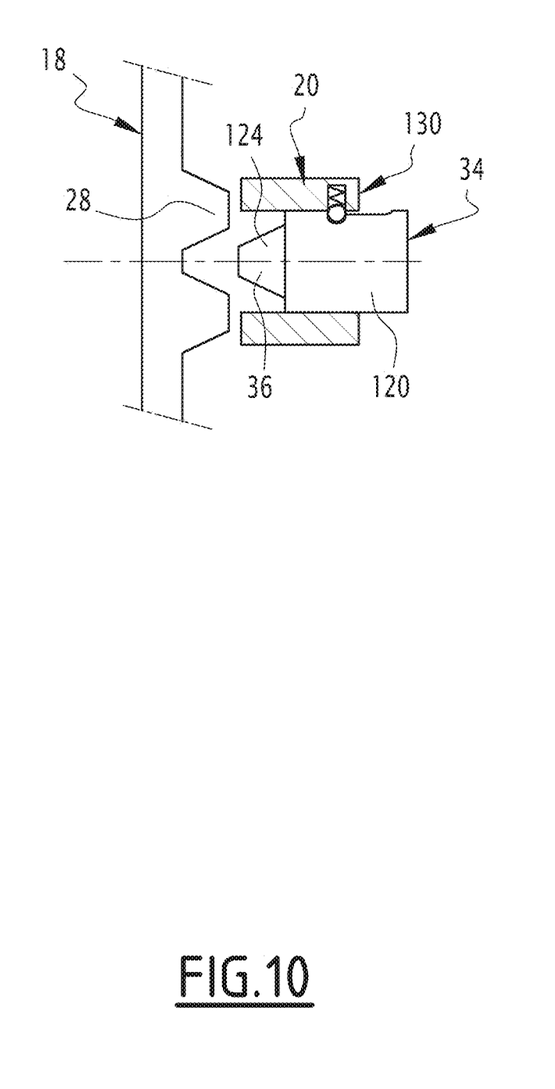
FIG. 10 shows the radial view of a part of the torque limiter shown in FIG. 8, the view corresponding to the view shown in FIG. 9.

The locking means 38 comprise snap-fitting means 130, such as an axial groove with a recessed end provided in the teeth insert 120 and a snap-fitting member, such as a ball (see FIG. 10).

Figure 8:
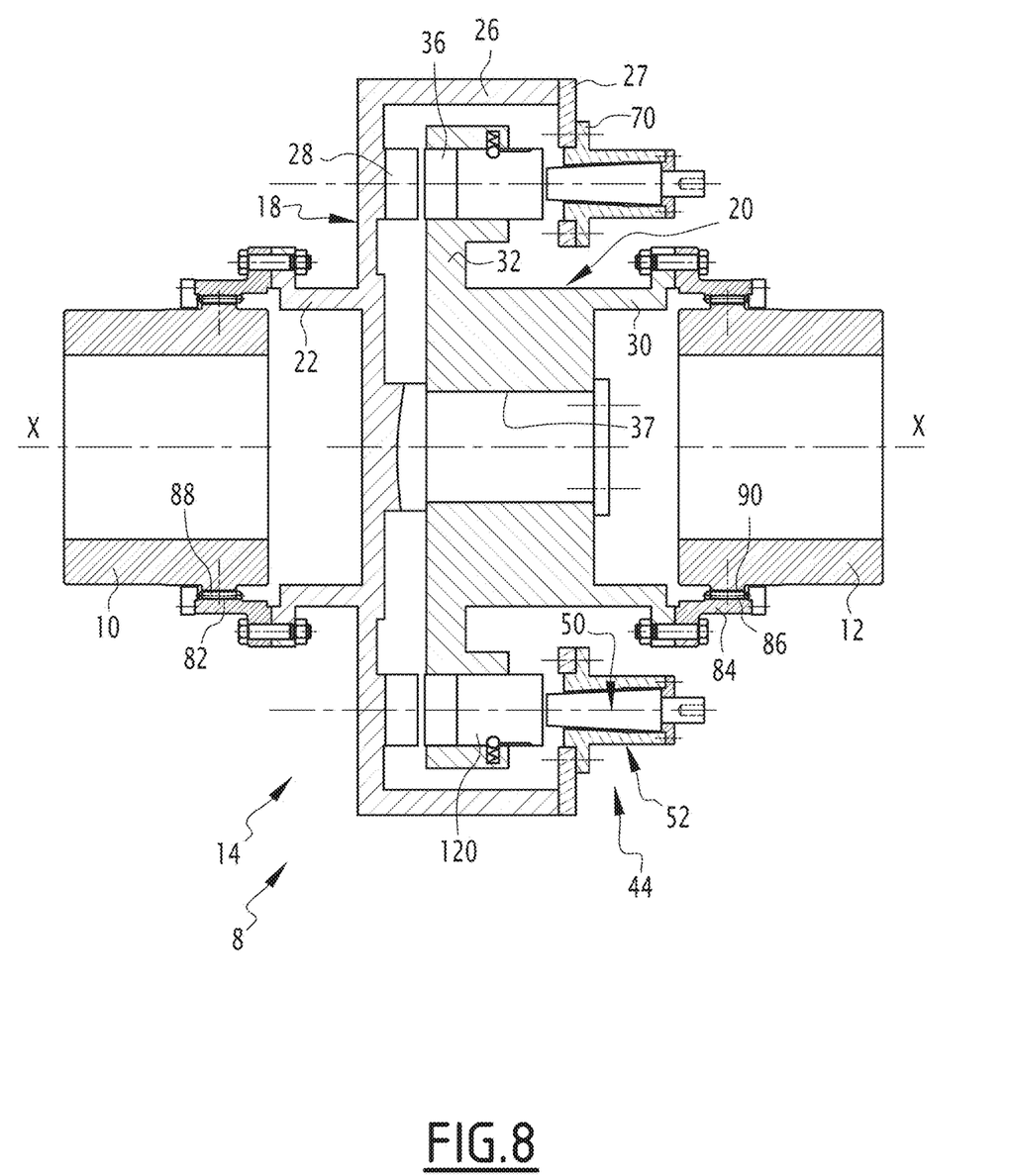
FIG. 8 shows the transmission assembly of FIG. 7 with the torque limiter in the release configuration.

FIG. 8 shows the installation of FIG. 7 with the torque limiter 14 in the release configuration. All the teeth inserts 120 are spaced apart from the first limiter teeth 36.

Figure 9:
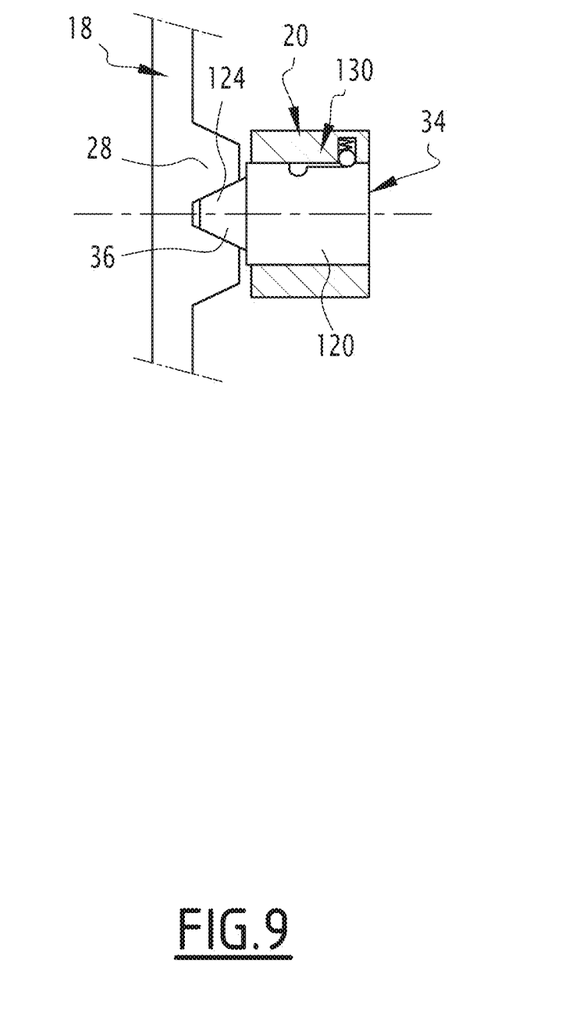
FIG. 9 is a radial view a part of torque limiter shown in FIG. 7.

FIGS. 9 and 10 show a detail of the torque limiter 14 in a radial view. A portion of the first body 18, a portion of the second body 20, a portion of the first limiter teeth 28 and a teeth insert 120 can be seen.

In general, the first and second limiter teeth 28, 36 may have any shape, provided that the shapes are suitable for generating the axial force transitioning the first and second limiter teeth 28, 36 or the first body 18 and the second body 20 from the engaged configuration thereof to the release configuration thereof under the effect of the torque transmitted. The first and second limiter teeth 28, 36 may be, e.g., oblique teeth. The first and second limiter teeth 28, 36 may have a regular or repetitive profile or else irregular and non-repetitive profile. In a variant, the torque limiter 14 may comprise limited bodies, such as balls or rollers, interposed between the first and second limiter teeth 28, 36.

The foregoing description contains technical features of the invention. Such technical features, although presented in a technical context and, if appropriate, in combination with other technical features, can be used every time individually, without the other technical features, insofar as technically possible.

The invention claimed is:

1. A torque limiter, comprising:
   a first body;
   a second body, the first body and the second body extending around a central axis, the first body supporting first limiter teeth, the second body supporting second limiter teeth mating with the first limiter teeth, the first limiter teeth and the second limiter teeth defining (i) an engaged configuration wherein the first limiter teeth and the second limiter teeth are suitable for transmitting a torque about the central axis of the first body to the second body, and (ii) a release configuration, wherein the first limiter teeth and the second limiter teeth are inapt to transmit a torque between the first body and the second body;
   locking means suitable for opposing a transition of the first limiter teeth and of the second limiter teeth from the release configuration thereof to the engaged configuration; and
   limited-retaining means suitable for retaining the first limiter teeth and the second limiter teeth in the engaged configuration thereof when the torque is less than a transmission torque limit, and suitable for yielding when the torque exceeds the transmission torque, the limited-retaining means comprising:
      at least one inner limited-retaining element comprising an outer contact surface; and
      at least one outer limited-retaining element comprising an inner contact surface mating with said outer contact surface, the inner and outer limited-retaining elements having (i) a retaining configuration, wherein the inner limited-retaining element is clamped into the outer limited-retaining element, and (ii) a yielded configuration wherein the inner limited-retaining element is loosened from the outer limited-retaining element.

2. The torque limiter according to claim 1, wherein said at least one outer contact surface has a frustoconical shape of revolution, and wherein said at least one inner contact surface has a frustoconical shape of revolution.

3. The torque limiter according to claim 2, wherein the opening angle of the outer and inner contact surfaces is between 1° and 20°.

4. The torque limiter according to claim 1, wherein said limited-retaining means further comprise at least one cartridge, each cartridge comprising one of said at least one outer limited-retaining element and one of said at least one inner limited-retaining element, wherein said at least one outer limited-retaining element comprises a sleeve, and wherein said at least one inner limited-retaining element comprises a punch provided with a piston, the piston extending through an opening of a cover with an opening of the cartridge.

5. The torque limiter according to claim 1, wherein when said at least one inner limited-retaining element and said at least one outer limited-retaining element are in the yielded configuration, an inner limit holder is offset along the central axis relative to an outer limit holder relative to the retaining configuration thereof.

6. The torque limiter according to claim 1, wherein in the engaged configuration thereof, the first limiter teeth and the second teeth limiter press against one another.

7. The torque limiter according to claim 1, further comprising:
   a first coupling flange fastened to said first body and comprising first coupling teeth that are suitable for cooperating with first mating coupling teeth; and
   a second coupling flange fastened to said second body and comprising second coupling teeth that are suitable for cooperating with second mating coupling teeth.

8. The torque limiter according to claim 1, wherein either the second limiter teeth are fixed in relation to said second body, or the second limiter teeth comprise teeth inserts axially movable relative to said second body between the engaged configuration and the release configuration.

9. The torque limiter according to claim 1, wherein said second body comprises two body parts axially movable relative to each other and fixed in rotation relative to each other about the central axis.

10. A transmission assembly comprising:
a drive shaft;
a driven shaft; and
the torque limiter according to claim 1, wherein the first body of the torque limiter is fixed in rotation to said drive shaft, and the second body of the torque limiter is fixed in rotation to said driven shaft.

11. The transmission assembly according to claim 10, wherein said drive shaft comprises first mating coupling teeth and said driven shaft comprises second mating coupling teeth, and wherein said torque limiter comprises:
a first coupling flange fastened to said first body and comprising first coupling teeth that are suitable for cooperating with said first mating coupling teeth; and
a second coupling flange fastened to said second body and comprising second coupling teeth that are suitable for cooperating with said second mating coupling teeth.

12. A method for using the transmission assembly according to claim 10, comprising:
supplying the transmission assembly, with the inner and outer limited-retaining elements of the torque limiter of the transmission assembly being in the yielded configuration thereof; and
setting the inner and outer limited-retaining elements into the retaining configuration thereof by applying the outer contact surface to the inner contact surface, clamping the inner limited-retaining element into the outer limited-retaining element.

13. The method according to claim 12, further comprising, following said setting:
exceeding the transmission torque limit, thereby leading to setting the first limiter teeth of the torque limiter of the transmission assembly and the second limiter teeth of the torque limiter of the transmission assembly in the release configuration; and
meshing the torque limiter by placing the at least one inner and outer limited-retaining elements of the torque limiter of the transmission in the retaining configuration thereof by applying the at least one outer contact surface of the torque limiter of the transmission assembly to the inner contact surface of the torque limiter of the transmission assembly, thereby clamping the at least one inner limited-retaining element into the at least one outer limited-retaining element.

* * * * *